United States Patent [19] [11] Patent Number: 4,940,263
Mayernik [45] Date of Patent: Jul. 10, 1990

[54] FITTING FOR TUBING

[75] Inventor: Andrew B. Mayernik, McKeesport, Pa.

[73] Assignee: Dormont Manufacturing Company, Pittsburgh, Pa.

[21] Appl. No.: 255,491

[22] Filed: Oct. 11, 1988

[51] Int. Cl.⁵ ............................................. F16L 19/04
[52] U.S. Cl. .................................. 285/342; 285/354; 285/382.7
[58] Field of Search ...................... 285/382.7, 382, 341, 285/342, 343, 354, 248, 249

[56] References Cited

U.S. PATENT DOCUMENTS

| Re. 22,713 | 1/1946 | Howe | 285/382 |
|---|---|---|---|
| 1,063,926 | 6/1913 | Schuermann | 285/382 |
| 1,740,767 | 12/1929 | Cox | 285/382 |
| 2,287,889 | 6/1942 | Krumsiek et al. | 285/382 |
| 2,406,488 | 8/1946 | Brock | 285/382 |
| 2,475,026 | 7/1949 | Hynes et al. | 285/382 |
| 2,479,058 | 8/1949 | Botting | 285/382 |
| 2,496,510 | 2/1950 | Wolfram | 285/382 |
| 2,693,375 | 11/1954 | Wurzburger | 285/382 |
| 3,055,684 | 9/1962 | Currie | 285/382 |
| 3,174,778 | 3/1965 | Gross | 285/341 |
| 3,214,200 | 10/1965 | Carlson et al. | 285/382.7 X |
| 3,219,367 | 11/1965 | Franck | 285/382 |
| 3,584,900 | 6/1971 | Lennon et al. | 285/14 |
| 4,162,802 | 7/1979 | Cox | 285/382.7 X |

FOREIGN PATENT DOCUMENTS

| 0734307 | 5/1966 | Canada | 285/249 |
|---|---|---|---|
| 1284753 | 12/1968 | Fed. Rep. of Germany | 285/249 |
| 2026707 | 12/1971 | Fed. Rep. of Germany | 285/354 |
| 3106985 | 9/1982 | Fed. Rep. of Germany | 285/343 |
| 0175468 | 5/1961 | Sweden | 285/249 |
| 0914094 | 12/1962 | United Kingdom | 285/249 |

Primary Examiner—Dave W. Arola
Assistant Examiner—Carol I. Bordas
Attorney, Agent, or Firm—Charles L. Lovercheck; Wayne L. Lovercheck; Dale R. Lovercheck

[57] ABSTRACT

A fitting made up of a body, a ferrule and a nut. The ferrule has a reduced size cylindrical member that is received in an end of a thin wall tube. The nut and the deformable ferrule are placed over the tube. The nut is wrenched onto the body, which deforms the ferrule at the ferrule groove displacing material of the ferrule inwardly against the tube, bringing the inner surface of the ferrule into sealing engagement with the outer surface of the tube and the inner surface of the tube with the outer reduced cylindrical surface of the body and at both faces of the ferrule. A seal is thus accomplished at the inside surface of the ferrule, forcing the tube into engagement with the reduced size member of the body, thereby reinforcing the tube.

10 Claims, 2 Drawing Sheets

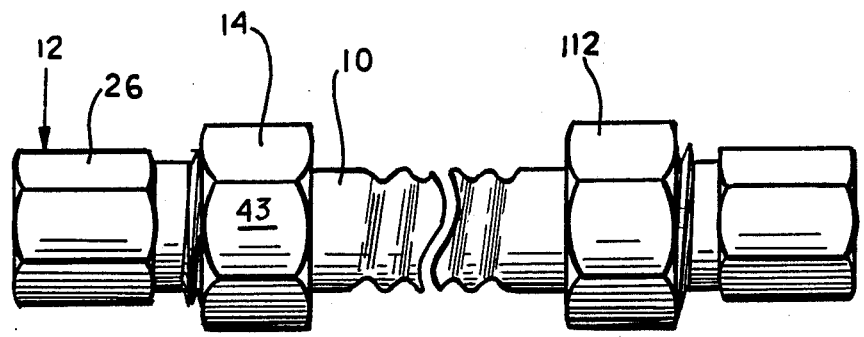
FIG. 1
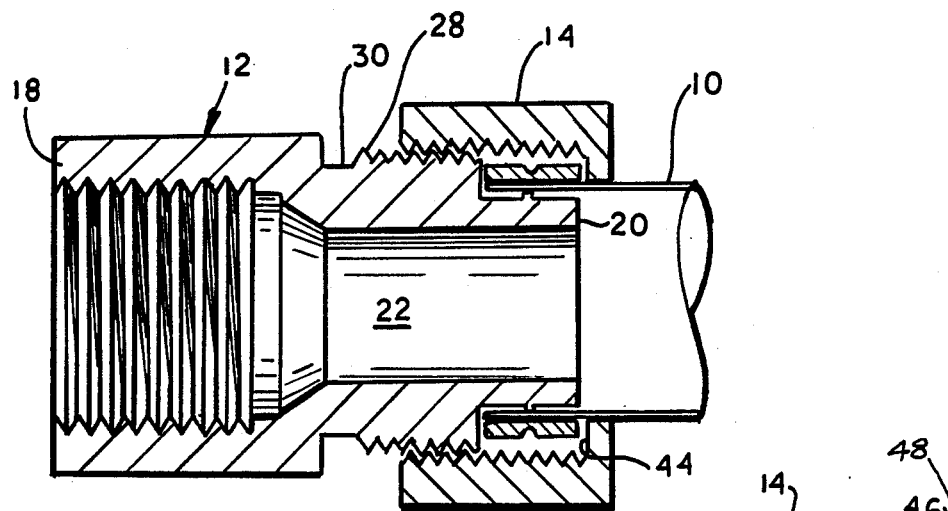
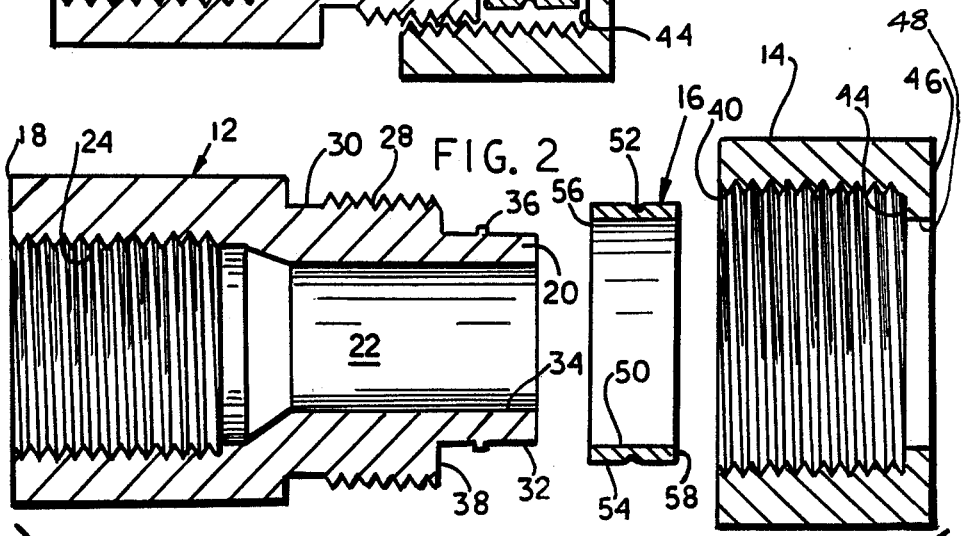
FIG. 2
FIG. 3

FITTING FOR TUBING

STATEMENT OF THE INVENTION

This invention relates to tube couplings and more particularly to a tube coupling with an improved compression arrangement.

The fitting consists of three parts: a body, a nut and a ferrule. The seal between the fitting and a tube to be connected is accomplished by means of the deformable ferrule which is displaced over the diameter of the tube as the nut is wrenched to the fitting body. A seal is accomplished at both faces of the ferrule. On thin wall tubes, the body of the fitting is provided with a raised annular surface under the grooved deformable section of the ferrule. As the ferrule is deformed, the thin wall tubing is also deformed against the supporting annular surface of the body accomplishing the primary seal.

A reduced size cylindrical end of the body enters the end of the tubing to be connected and reinforces it and supports the thin wall of the tube against the force that is exerted by the ferrule when the nut is tightened.

REFERENCE TO PRIOR ART

Tube couplings of the general type disclosed herein employ a contractible ferrule arrangement, of a type well-known in the art, to grip a tube. However, all of the couplings shown in the references have deficiencies.

Applicant is aware of the following patents:

| | |
|---|---|
| Re.22,713 to Howe | 2,496,510 to Wolfram |
| 1,063,926 to Schuermann | 2,693,375 to Wurzburger |
| 1,740,767 to Cox | 3,055,684 to Currie |
| 2,287,889 to Krumsiek | 3,219,367 to Franck |
| 2,406,488 to Brock | 3,584,900 to Lennon |
| 2,475,026 to Hynes | 4,632,240 to Goncalves |
| 2,479,058 to Botting | |

All of these patents show various types of compression fittings and flangeless fittings. None of these patents disclose a fitting having the structure and advantages of the fitting attachment disclosed herein.

BACKGROUND OF THE INVENTION

The present invention relates to a compression type fitting proposed for use on low pressure piping systems for residential, commercial and industrial fuel gas and similar applications. The fitting was specifically designed to meet the requirements as specified in A.G.A. requirements for Interior Natural Gas Piping Systems using corrugated stainless steel conduit, No. 1-87. Although not limited thereto, the basic principal of this invention in modified forms is applicable for use on other fluid pressure systems using a variety of materials. This invention provides a simplified economical method of field installation of leak tight tubing joints. No special end preparation of the tubing or special tooling is required in order to make the joints and reconnection of the joints possible. In tightening the nut into the body to make the joint, only longitudinal force is applied to the assembly and axial torque which may be detrimental to thin wall tubing does not occur. Laboratory tests have been performed using tubing manufactured from stainless material. The tubing's outside diameter was 0.700" and the wall thickness was 0.010". Fitting body and nut were made of steel and the ferrule was made of half hard DCA brass. Seals were accomplished with only partial deformation of the ferrule groove using moderate wrenching torque on the nut. Laboratory tests met all of the requirements of A.G.A. specifications.

OBJECT OF THE INVENTION

It is an object of the invention to provide an improved fitting.

Another object of the invention is to provide a fitting that is simple in construction, economical to manufacture and simple and efficient to use.

Another object of the invention is to provide a fitting that requires no special end preparation of pipe.

Another object of the invention is to provide a fitting wherein only longitudinal force is applied to the assembly and axial torque does not occur.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

FIG. 1 is a side view of the fitting, according to one embodiment of the invention, shown connected to a length of tubing and another embodiment of the fitting on the opposite end of the tubing.

FIG. 2 is a longitudinal cross-sectional view of the fitting, according to one embodiment of the invention, shown in FIG. 1.

FIG. 3 is an exploded view of the fitting, according to the invention, shown in FIGS. 1 and 2.

DETAILED DESCRIPTION OF PREFERRED EMBODIMENT

Figure 4:
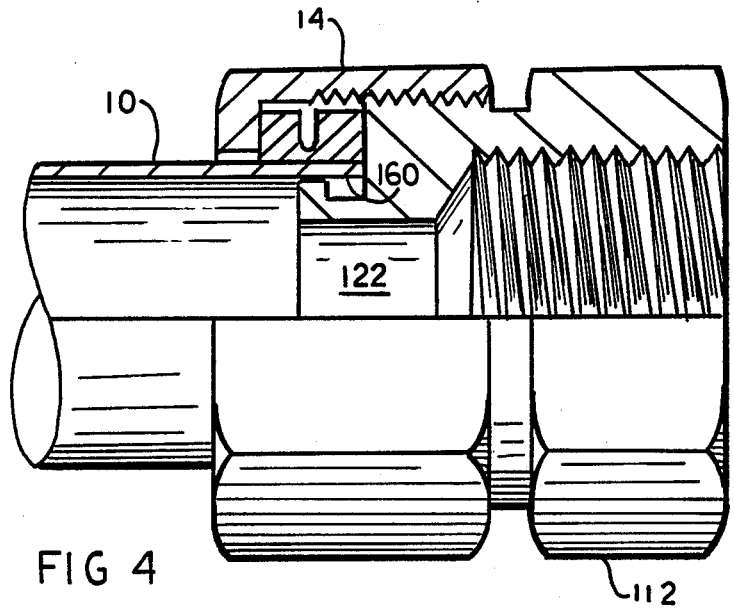
FIG. 4 is a longitudinal half sectional view of another embodiment of the fitting, according to the invention.

Now with more particular reference to the drawing, the embodiment of the invention shown in FIGS. 1, 2 and 3, a fitting is made up of main body 12, nut 14 and ferrule 16, which is intended to be used to connect one end of tube 10 in a flowline, which may include another fitting 112 to connect the other end.

Body 12 has first end 18, reduced size, cylindrical second end 20 and intermediate part 30. First end 18, reduced size, cylindrical second end 20 and intermediate part 30 are integrally connected together with a generally cylindrical flow passage 22 therethrough. First end 18 of body 12 is internally threaded with internal threads 24 and has external wrench engaging flats 26. Intermediate part 30 has external threads 28. Reduced size cylindrical second end 20 has an external cylindrical surface 32 and may have circumferential bead 36. External threads 28 terminate in shoulder 38, which is disposed at a right angle to cylindrical surface 32 on reduced size, cylindrical second end 20.

Nut 14 has flat wrench engaging surfaces 43 and internal threads 40 which terminate at inwardly directed flange 46. Flange 46 has annular shoulder 44, which is disposed at right angles to the central axis of internal threads 40. Flange 46 terminates in tube receiving opening 48.

Ferrule 16 is in the form of an annular hollow ring made of a deformable material such as, for example, relatively soft brass. However, it could be made of a suitable non-metallic material, having inside cylindrical surface 50, outside cylindrical surface 54, first flat end 56, second end 58 and outer peripheral groove 52.

In practice, nut 14 is placed over an end of tube 10 and ferrule 16 is also placed over the same end of tube 10. Reduced size, cylindrical second end 20 of body 12 is inserted into an end of tube 10, with bead 36 engaging the inside surface of tube 10. Thus the end of tube 10 is disposed between inside cylindrical surface 50 of ferrule 16 and bead 36. Tube 10 may be a relatively thin walled tube, such as, for example, 0.01. At this point, ferrule 16 is disposed between threads 40 of nut 14 and tube 10. Nut 14 will then be wrenched onto body 12 while body 12 is held against rotation by a second wrench on flats 26. When nut 14 is tightened, shoulder 44 of nut 14 will engage end 58 of ferrule 16. End 56 of ferrule 16 will engage shoulder 38. A compressive force will result on ends 56 and 58 of ferrule 16 between shoulder 38 and shoulder 44, distorting ferrule 16 and forcing the inner periphery 50 of ferrule 16 against the outside of tube 10. This will force the inside of tube 10 against surface 32 and bead 36. The inside surface 50 of ferrule 16 will form a seal with the outside surface of tube 10 and outside cylindrical surface 54 of ferrule 16 will engage internal threads 40 of nut 14 and form a seal.

Figure 5:
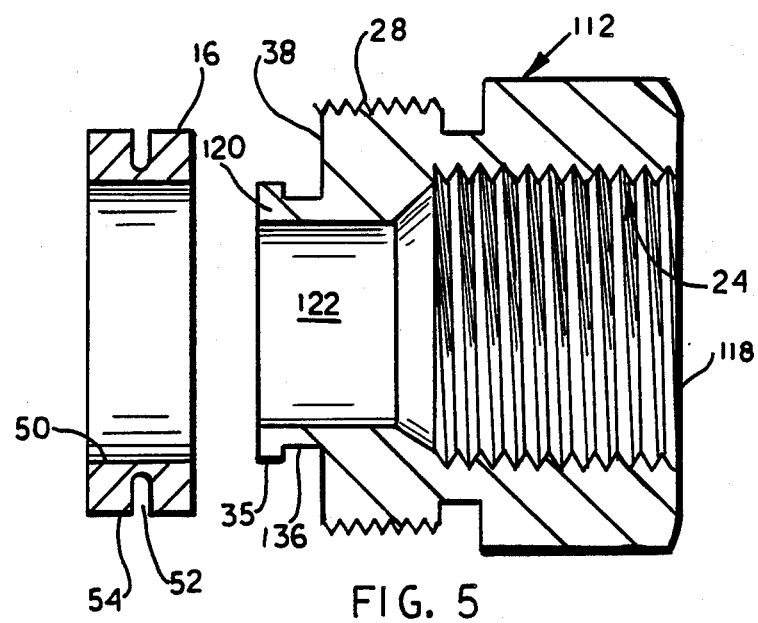
FIG. 5 is an exploded view of parts of the embodiment of the invention shown in FIG. 4.

In the embodiment of the invention shown in FIGS. 4 and 5, body 112, nut 14 and ferrule 16 are identical to the corresponding parts in FIGS. 1, 2 and 3, with the exception that groove 136 is formed in end 120, as shown in FIGS. 4 and 5, instead of external bead 36 on body 12, as shown in FIGS. 1, 2 and 3.

When nut 14 is tightened on threads 28 of body 112, ferrule 16 is deformed, forcing inner periphery 50 of ferrule 16 into engagement with the outer surface of tube 10 and forcing the inner surface of tube 10 into sealing engagement with cylindrical surface 35.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A fitting for connecting to an end of a thin walled tube comprising a body, a nut and a ferrule,
    said body having a generally cylindrical flow passage therethrough, a first end, a reduced size cylindrical second end and an intermediate part,
    said flow passage having internal threads at said first end,
    said internal threads having a central axis,
    said intermediate part of said body having external threads,
    said reduced size cylindrical second of said body having an external cylindrical surface,
    an outwardly extending shoulder having an annular surface generally planar throughout its extent extending outwardly from and intersecting said cylindrical surface of said reduced size cylindrical second end,
    said ferrule comprising a hollow cylindrical ring made of a deformable material having an outside cylindrical surface, an inside cylindrical surface, a first end and a second end,
    said internal cylindrical surface of said ferrule being adapted to receive an end of said tube,
    said nut having hollow internal threads terminating at an inwardly directed annular flange having an annular surface generally planar throughout its extent disposed at right angles to said central axis of said internal threads,
    both said angular surface on said intermediate part and said annular surface on said flange being disposed generally perpendicular to said reduced size second end,
    said tube abutting said shoulder which joins said intermediate part and said cylindrical surface,
    said nut being adapted to receive said ferrule and to threadably engage said external threads of said intermediate part of said body, whereby said ferrule creates a seal when it is sandwiched between said annular shoulder of said flange, and said outwardly extending shoulder extending outwardly from said cylindrical surface of said reduced size cylindrical second end, between said internal threads of said nut and the outside surface of said tube end when said nut is tightened onto said body.

2. The fitting recited in claim 1 wherein said ferrule has an external peripheral groove formed in its outer cylindrical surface for controlling the deformation of said ferrule when said nut exerts a compressive force on said ferrule for facilitating the sealing of said ferrule with said fitting.

3. The fitting recited in claim 1 wherein an outwardly extending peripheral bead is integrally attached to said reduced size cylindrical second end of said body,
    said bead being adapted to sealingly engage the inner periphery of said tube when said nut is tightened.

4. The fitting recited in claim 3 wherein said first end of said body has wrench receiving means on the outside thereof.

5. The fitting recited in claim 4 wherein a second wrench receiving means is provided on said nut, whereby said nut can be tightened with only longitudinal force on the assembly.

6. The fitting recited in claim 1 wherein said outer substantially cylindrical surface has a groove therein adjacent said shoulder extending outwardly from said cylindrical surface of said reduced size, cylindrical second end.

7. The fitting recited in claim 6 wherein said groove is adapted to receive a part of said ferrule deformed and forced into it when said nut is tightened.

8. A fitting for connecting a thin walled tube to a flow line comprising a body, a ferrule and a nut,
    said tube having an inside peripheral surface and an outside peripheral surface,
    said body having a first end, an intermediate part and a reduced sized cylindrical second end,
    a flow passage through said body, means to connect said first end of said body to said body to said flow line,
    said reduced size cylindrical second end having an outside cylindrical surface intersecting at said intermediate part in an outwardly extending shoulder having a generally planar annular surface,
    said nut having an internally threaded open end and an inwardly directed flange thereon having a generally planar annular surface, said outwardly extending surface on said intermediate part and said outward surface on said flange being generally planar throughout their extents and perpendicular to said reduced size surface, said tube abetting said shoulder at said intersection of said reduced size cylindrical surface and said shoulder, said flange having an inwardly directed shoulder terminating in a tube receiving opening, said ferrule comprising a ring made of deformable material having a first end, a second end, an inside cylindrical surface and an outside cylindrical surface, said ends or said ferrule being generally perpendicular to said cylindrical surface, external threads on said intermediate part of said body, said nut being adapted to receive said ferrule, said ferrule being adapted to receive an end of said tube, said end of said tube being adapted to receive said reduced size cylindrical second end of said body, said not having internal threads, said internal threads on said not being adapted to engage said external threads on said intermediate part, said flat surfaces on said flange and said shoulder whereby said nut can be wrenched onto said body urging said ferrule into engagement with said shoulders, whereby said ferrule is deformed into engagement with the outside periphery of said tube forcing said inside cylindrical surface of said ferrule into engagement with said outside cylindrical surface of said tube and forcing the inside peripheral surface of tube to deform into engagement with outside cylindrical surface of said body whereby a seal is accomplished at said outside cylindrical surface.

9. The fitting recited in claim 8 wherein a circular bead is integrally attached to an intermediate part of said reduced size cylindrical second end, said ferrule is adapted to force said tube into engagement with said bead.

10. The fitting recited in claim 8 wherein a groove is formed in said reduced size cylindrical second end adjacent said shoulder.

* * * * *